United States Patent
LaBanca, Jr. et al.

(10) Patent No.: US 10,572,871 B1
(45) Date of Patent: Feb. 25, 2020

(54) PERSONALIZED GIFT CARDS—POST-TRANSACTION COMMUNICATION

(71) Applicant: Square, Inc., San Francisco, CA (US)

(72) Inventors: John LaBanca, Jr., Dunwoody, GA (US); Matthew T. Kursmark, New York, NY (US); Christopher Lang Mocko, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 228 days.

(21) Appl. No.: 14/560,180

(22) Filed: Dec. 4, 2014

(51) Int. Cl.
*G06Q 20/34* (2012.01)
*G06Q 20/20* (2012.01)

(52) U.S. Cl.
CPC ......... *G06Q 20/3558* (2013.01); *G06Q 20/20* (2013.01); *G06Q 20/342* (2013.01)

(58) Field of Classification Search
CPC ... G06Q 20/20; G06Q 20/342; G06Q 20/3558
See application file for complete search history.

(56) References Cited

U.S. PATENT DOCUMENTS

| | | | |
|---|---|---|---|
| 5,276,311 A | 1/1994 | Hennige | |
| 5,530,232 A | 6/1996 | Taylor | |
| 5,585,787 A | 12/1996 | Wallerstein | |
| 6,193,155 B1 | 2/2001 | Walker et al. | |
| 6,764,005 B2 | 7/2004 | Cooper | |
| 7,818,399 B1 | 10/2010 | Ross, Jr. et al. | |
| 8,046,266 B1* | 10/2011 | Geller | G06Q 30/02 705/14.1 |
| 8,175,908 B1 | 5/2012 | Anderson | |
| 8,799,100 B2 | 8/2014 | Walker et al. | |
| 9,864,986 B1 | 1/2018 | White et al. | |
| 9,990,626 B1 | 6/2018 | LaBanca, Jr. et al. | |
| 10,169,769 B1 | 1/2019 | Mocko | |
| 2001/0029470 A1* | 10/2001 | Schultz | G06Q 20/0453 705/26.41 |
| 2003/0216969 A1 | 11/2003 | Bauer et al. | |

(Continued)

OTHER PUBLICATIONS

Samsudin, Noor Azah, et al. "A customizable wireless food ordering system with realtime customer feedback." 2011 IEEE Symposium on Wireless Technology and Applications (ISWTA). IEEE, 2011.*

(Continued)

*Primary Examiner* — Asfand M Sheikh
(74) *Attorney, Agent, or Firm* — Lee & Hayes, P.C.

(57) ABSTRACT

Techniques and arrangements for personalizing gift cards based, in part, on exchanging personalized messages between a customer that buys a gift card and a customer that receives and uses the gift card. A point-of-sale (POS) device of a merchant may receive a personalized message from the customer buying the gift card at the time of the purchase. The POS device may then present the personalized message to the customer receiving the gift card when the customer uses the gift card to satisfy a cost of a transaction between the merchant and the customer. During or after the transaction, the POS device may further receive feedback from the recipient customer of the gift card. The POS device may then send the feedback to the customer that originally bought the gift card.

20 Claims, 7 Drawing Sheets

(56) References Cited

U.S. PATENT DOCUMENTS

| | | | |
|---|---|---|---|
| 2004/0034564 A1* | 2/2004 | Liu | G06Q 30/02 705/15 |
| 2006/0235755 A1 | 10/2006 | Mueller et al. | |
| 2008/0243690 A1* | 10/2008 | Paintin | G06Q 20/10 705/44 |
| 2010/0017278 A1* | 1/2010 | Wilen | B42D 15/045 705/14.2 |
| 2010/0023374 A1* | 1/2010 | Berwitz | G06Q 30/02 705/14.4 |
| 2010/0036746 A1 | 2/2010 | Hashop et al. | |
| 2010/0121764 A1* | 5/2010 | Niedermeyer | G06Q 20/28 705/44 |
| 2010/0177343 A1* | 7/2010 | Shapiro | G06Q 10/0637 358/1.15 |
| 2010/0280879 A1* | 11/2010 | O'Sullivan | G06Q 30/02 705/14.19 |
| 2010/0314276 A1* | 12/2010 | Wilen | B42D 5/025 206/459.5 |
| 2011/0106698 A1* | 5/2011 | Isaacson | G06Q 20/105 705/41 |
| 2011/0251962 A1 | 10/2011 | Hruska | |
| 2012/0084210 A1 | 4/2012 | Farahmand | |
| 2012/0296741 A1* | 11/2012 | Dykes | G06Q 20/322 705/14.53 |
| 2012/0316983 A1 | 12/2012 | Shinnebarger et al. | |
| 2013/0080239 A1 | 3/2013 | Okerlund | |
| 2013/0117150 A1* | 5/2013 | Aliaga | G06Q 30/06 705/26.8 |
| 2013/0173459 A1 | 7/2013 | Simonian | |
| 2013/0191280 A1 | 7/2013 | Simonian | |
| 2013/0304605 A1 | 11/2013 | Glass et al. | |
| 2014/0114741 A1 | 4/2014 | Genc-Kaya et al. | |
| 2014/0156675 A1 | 6/2014 | Burstein et al. | |
| 2014/0180855 A1* | 6/2014 | Argue | G06Q 30/0631 705/21 |
| 2014/0207610 A1* | 7/2014 | Erez | G06O 30/0633 705/26.7 |
| 2014/0214626 A1* | 7/2014 | Bowers | G06Q 30/0635 705/26.81 |
| 2014/0258019 A1 | 9/2014 | Cummins et al. | |
| 2014/0258424 A1* | 9/2014 | Ganesh | H04L 51/18 709/206 |
| 2016/0036739 A1* | 2/2016 | Glass | H04L 51/046 709/206 |
| 2016/0371668 A1* | 12/2016 | Priebatsch | G06Q 20/204 |

OTHER PUBLICATIONS

Non-Final Office Action dated Mar. 30, 2017, for U.S. Appl. No. 14/560,156, of LaBanca, J., et al., filed Dec. 4, 2014.
Final Office Action dated Oct. 24, 2017, for U.S. Appl. No. 14/560,156, of LaBanca, J., et al., filed Dec. 4, 2014.
Non-Final Office Action dated Jul. 10, 2015, for U.S. Appl. No. 14/526,361, of White, M.W., et al., filed Oct. 28, 2014.
Final Office Action dated Oct. 5, 2015, for U.S. Appl. No. 14/526,361, of White, M.W., et al., filed Oct. 28, 2014.
Advisory Action dated Jan. 21, 2016, for U.S. Appl. No. 14/526,361, of White, M.W., et al., filed Oct. 28, 2014.
Non-Final Office Action dated Apr. 8, 2016, for U.S. Appl. No. 14/526,361, of White, M.W., et al., filed Oct. 28, 2014.
Final Office Action dated Nov. 14, 2016, for U.S. Appl. No. 14/526,361, of White, M.W., et al., filed Oct. 28, 2014.
Advisory Action dated Feb. 24, 2017, for U.S. Appl. No. 14/526,361, of While, M.W., et al., filed Oct. 28, 2014.
Non-Final Office Action dated Mar. 28, 2017, for U.S. Appl. No. 14/580,511, of Mocko, C.L., filed Dec. 23, 2014.
Non-Final Office Action dated Jul. 27, 2017, for U.S. Appl. No. 14/580,567, of Mocko, C.L., filed Dec. 23, 2014.
Notice of Allowance dated Aug. 3, 2017, for U.S. Appl. No. 14/526,361, of White, M.W., et al., filed Oct. 28, 2014.
Final Office Action dated Nov. 16, 2017, for U.S. Appl. No. 14/580,511, of Mocko, C.L., filed Dec. 23, 2014.
Final Office Action dated Jan. 22, 2018, for U.S. Appl. No. 14/580,567, of Mocko, C.L, filed Dec. 23, 2014.
Notice of Allowance dated Feb. 2, 2018, for U.S. Appl. No. 14/560,156, of LaBanca, J.J., et al., filed Dec. 4, 2014.
Non-Final Office Action dated Jun. 20, 2018, for U.S. Appl. No. 14/580,511, of Mocko, C.L., filed Dec. 23, 2014.
Notice of Allowance dated Aug. 23, 2018, for U.S. Appl. No. 14/580,567, of Mocko, C.L., filed Dec. 23, 2014.
Advisory Action dated Apr. 11, 2019, for U.S. Appl. No. 14/580,511, of Mocko, C.L., filed Dec. 23, 2014.
Final Office Action dated Jan. 24, 2019, for U.S. Appl. No. 14/580,511, of Mocko, C.L., filed Dec. 23, 2014.
Non-Final Office Action dated Sep. 6, 2019, for U.S. Appl. No. 14/580,511, of Mocko, C.L., filed Dec. 23, 2014.

* cited by examiner

PERSONALIZED GIFT CARDS—POST-TRANSACTION COMMUNICATION

BACKGROUND

Merchants operating retail stores use a variety of sales methods to try to increase their sales. For instance, one sales method that merchants often use is selling gift cards to customers. For example, a first customer may purchase a gift card at a retail store of a merchant for a second customer. The second customer may then use the gift card at the retail store to buy goods and/or services from the merchant. Currently, after the first customer gives the gift card to the second customer, no other interactions occur between the customers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
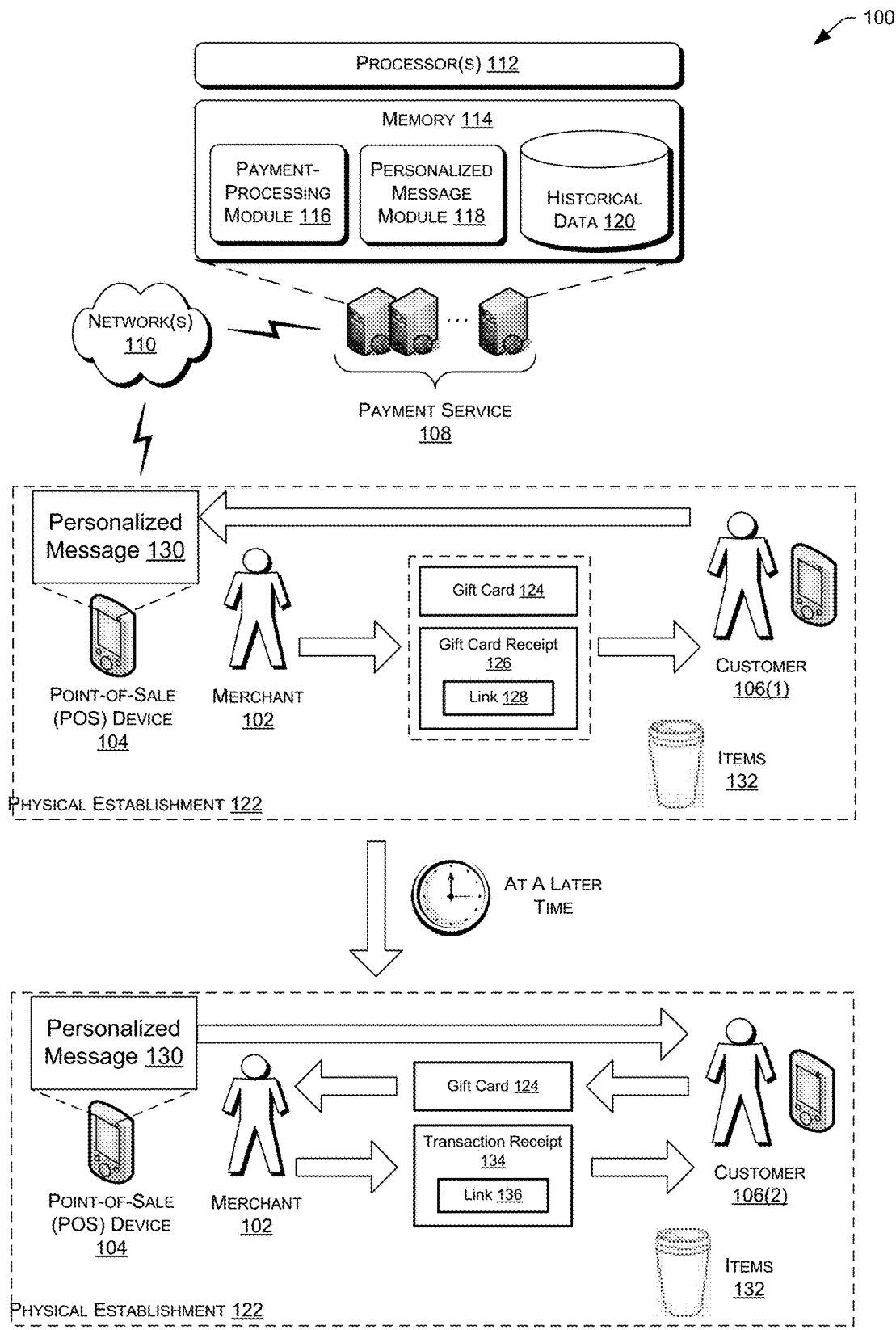
FIG. 1 illustrates an example environment that includes a merchant operating a point-of-sale (POS) device to conduct transactions with customers. In this example, a customer purchases a gift card from the merchant. In response, the POS device of the merchant personalizes the gift card by recording and storing a personalized message from the customer. Later, a recipient customer of the gift card uses the gift card at the POS device to satisfy a cost of a transaction with the merchant and, in response, the POS device or another device presents the recipient customer with the personalized message.

Some implementations described herein include techniques and arrangements for personalizing gift cards based, in part, on exchanging personalized messages between a customer that buys a gift card and a customer that receives and uses the gift card.

For instance, a merchant may engage in a transaction with a customer (buying customer) for the sale of a gift card. The merchant may utilize an electronic device of the merchant, such as a point-of-sale (POS) device, to engage in the transaction with the buying customer for the gift card, which may also activate the gift card. During the transaction for the gift card, the merchant may capture, via a camera of the POS device, a video of the buying customer providing a personalized message to a second customer (recipient customer), where the recipient customer is to receive the gift card from the buying customer. The POS device may then store, in association with an identifier of the gift card, the video of the buying customer providing the personalized message.

Later, the merchant may engage in a transaction with the recipient customer for the sale of an item in the physical establishment of the merchant. The item may comprise a physical good (e.g., food, an electronic device, sporting equipment, clothes, clothing accessories, etc.), a representation of a digital good (e.g., a video, a song, etc.), or a representation of a service (e.g., a seat at a restaurant, a message, etc.). The merchant may utilize the POS device to engage in the transaction with the recipient customer for the item. For instance, the recipient customer may use the gift card from the buying customer at the POS device to satisfy a cost of the transaction for the item with the merchant.

During the transaction for the item, the POS device may determine that the recipient customer is using the gift card to satisfy the cost of the transaction. The POS device may then present, via a display of the POS device, the video of the buying customer providing the personalized message to the recipient customer. For instance, the POS device may use the identifier of the gift card during the transaction and determine that there is a personalized message associated with the gift card. The POS device may then retrieve the video of the personalized message and the merchant may present the video to the recipient customer.

In the example above, for instance, envision that the buying customer purchases a $50 gift card from the merchant for the recipient customer since it is the recipient customer's birthday in two days. At the time of buying the $50 gift card from the merchant, the buying customer also decides that he wants to leave a personalized message for the recipient customer, which the recipient customer will receive when the recipient customer uses the $50 gift card. As such, the merchant utilizes the POS device to capture, using a camera of the POS device, a video of the buying customer providing the personalized message to the recipient customer, where the personalized message includes the buying customer wishing the recipient customer a happy birthday. The POS device then stores, in association with an identifier of the $50 gift card, the video of the buying customer providing the personalized happy birthday message to the recipient customer.

Two days later, the buying customer gives the $50 gift card to the recipient customer on the recipient customer's birthday. The recipient customer then goes to the physical establishment of the merchant and purchases an item from the merchant. For instance, the recipient customer may use the $50 gift card at the POS device of the merchant to satisfy the cost of the transaction for of the item with the merchant. The POS device may then determine that the recipient customer is using the $50 gift card and, in response, present the video of the buying customer providing the personalized happy birthday message to the recipient customer, via a display of the POS device.

While the above provides one example of a personalized message, the POS device may present the recipient customer with other types of personalized messages. For instance, the POS device may receive videos, pictures, audio recordings, web links, slideshows (or other animations), recommended items to purchase at the merchant, or the like from the buying customer and/or other customers. The POS device may then present one or more of these personalized messages to the recipient customer after the POS device detects that the recipient customer is using the gift card to satisfy the cost of the transaction with the merchant.

For example, the POS device and/or another device may use a microphone to capture an audio recording of the buying customer providing a personalized message, or a camera to capture an image of the buying customer providing a personalized message. For another example, the POS device could receive a slideshow (or other type of animation) from a device of the buying customer for the recipient customer. Finally, for a third example, the POS device may receive a recommendation from the buying customer for the recipient customer, where the recommendation includes an item offered by the merchant that the recipient customer should purchase with the gift card.

Furthermore, while the above provides one example, the POS device of the merchant may use other techniques to receive a personalized message (such as the video of the buying customer providing the personalized message to the recipient customer) from the buying customer. For instance, the POS device may receive, from a device of the buyer, the personalized message for the recipient customer. Furthermore, the POS device may provide the buying customer with a physical and/or digital receipt for the transaction between the merchant and the buying customer. The receipt may include a link (which is discussed in greater detail below), which the buying customer can use to send the personalized message to the POS device.

For example, the POS device may print a physical receipt that includes link (e.g., such as a uniform resource locator (URL) to a website hosted by the merchant) and the merchant may give the physical receipt to the buying customer at the time of the buying customer purchasing the gift card. The buying customer may then use the link to send, to the POS device, the personalized message via a device of the buying customer. For another example, the POS device may receive (and store) contact information from the buying customer at the time of the buying customer purchasing the gift card. The POS device may then send, using the contact information of the buying customer, a digital receipt for the transaction to the device of the buying customer, where the digital receipt includes the link. In response to receiving the digital receipt, the buying customer may then use the link to send, to the POS device, the personalized message via a device of the buying customer.

Additionally, the POS device of the merchant may use other techniques to present personalized messages (such as the video of the buying customer providing the personalized message to the recipient customer) from the buying customer to the recipient customer. For instance, the POS device may send, using contact information of the recipient customer, the personalized message from the buying customer to a device of the recipient. Furthermore, the POS device may provide the recipient customer with a physical and/or digital receipt for the transaction between the merchant and the recipient customer. The receipt may include a link (e.g., a uniform resource locator (URL) to a website hosted by the merchant), which the recipient customer can use to view the personalized message from of the buying customer.

For example, the POS device may print a physical receipt that includes the link and the merchant may give the physical receipt to the recipient customer at the time of the recipient customer using the gift card. The recipient customer may then use the link to view the personalized message from the buying customer using a display of a device of the recipient customer. For another example, the POS device may receive (and store) contact information from the recipient customer at the time of the recipient customer using the gift card. The POS device may then send, using the contact information of the recipient customer, a digital receipt for the transaction to the device of the recipient customer, where the digital receipt includes the link for viewing the personalized message. In response to receiving the digital receipt from the POS device, the recipient customer may then use the link to view the personalized message using the display of the device of the recipient customer.

In the examples above, the POS device of the merchant may further receive more than one personalized message from the buying customer for the recipient customer. For example, the POS device may receive two videos from the buying customer (using any of the methods described above), where each of the two videos provides a personalized message to the recipient customer. The POS device may then present one or more of the videos (using the methods described above) to the recipient customer each time the recipient customer uses the gift card to satisfy a cost of a transaction between the merchant and the recipient customer.

Besides personalized messages, the buying customer may further purchase one or more additional items at the time of and/or after buying the gift card for the recipient customer. The merchant may then provide the one or more items to the recipient customer at the time of the recipient customer using the gift card. For instance, the buying customer may purchase one or more items from the merchant along with the gift card. The POS device of the merchant may then store, in association with the identifier of the gift card, one or more identifiers for the one or more items. In response to the POS device determining that the recipient customer is using the gift card to satisfy the cost of the transaction with the merchant, the POS device may then notify the merchant and/or the recipient customer of the one or more items.

For example, the buying customer may purchase a cup of coffee from the merchant for the recipient customer at the same time as the gift card, however, the merchant may not provide the cup of coffee to the buying customer at that time. Instead, the POS device may associate an identifier for the cup of coffee with the identifier of the gift card. Later, when the recipient customer uses the gift card at the merchant to satisfy the cost of a transaction with the merchant, the POS device may notify the merchant and/or the recipient customer about the cup of coffee. The merchant may then provide the recipient customer with a cup of coffee.

Finally, while the examples above discuss the recipient customer using the gift card at the physical establishment of the merchant, the recipient customer may use the gift card outside of the physical establishment of the merchant. For instance, the recipient customer may use a device to purchase items from a website (or other online source) hosted by the merchant using the gift card. The device may then receive the personalized message from the merchant in response to using the gift card to purchase the items. For example, a display of the device of the recipient customer may display the personalized message to the recipient customer in response to the recipient customer purchasing the items on the website of the merchant.

After the recipient customer has used the gift card to satisfy the cost of the transaction with the merchant, the recipient customer may then provide feedback for the merchant and/or the buying customer. For instance, the POS device may receive feedback from the recipient customer at the time of and/or after the transaction with the merchant.

For example, the POS device may capture, using a camera (or microphone or the like) of the POS device, feedback from the recipient customer at the time of the recipient customer using the gift card to satisfy the cost of the transaction with the merchant. For another example, the POS device may receive, from the device of the recipient customer, the feedback. Furthermore, for a third example, the POS device may provide the recipient customer with a link (e.g., URL to a website or the like) for sending feedback to the POS device. The POS device may provide the link to the recipient customer using a physical receipt that the merchant gives to the recipient customer at the time of the transaction, or the POS device may provide the link to the recipient customer by sending, using the contact information of the recipient customer, a digital receipt to the device of the recipient.

In response to the POS device receiving the feedback from the recipient customer, the POS device may then present the feedback to the buying customer. For example, the POS device may present the feedback to the buying customer via a display of the POS device the next time the buying customer is in the physical establishment of the merchant. For another example, the POS device may send, using the contact information of the buying customer that the POS device stored at the time of the buying customer buying the gift card, the feedback (or a link to view the feedback) to the device of the buying customer. The buying customer may then view the feedback using the display of the device of the buying customer.

In the example above, for instance, envision that the recipient customer is purchasing the item using the gift card. At the time of the recipient customer purchasing the item, the POS device may receive (and store) contact information for the recipient customer. The POS device then sends, using the contact information of the recipient customer, a digital receipt for the transaction of the item to the device of the recipient customer. In response to receiving the digital receipt from the POS device, the recipient customer then uses the digital receipt (such as a link on the digital receipt) to send, using the device of the recipient customer, a communication back to the POS device, where the communication includes the feedback.

After receiving the feedback from the device of the recipient customer, the POS device then sends the feedback and/or a link to view the feedback to the buying customer. For instance, the POS device may use contact information for the buying customer (which was received and stored, in association with the identifier of the gift card at the time of the buying customer purchasing the gift card) to send the feedback to the device of the buying customer. The buying customer may then view the feedback using the display of the device of the buying customer.

In the example above, the recipient customer may provide feedback that comprises a personalized message of the recipient customer to the buying customer (such as the personalized messages described above), a review of the merchant from the recipient customer, sales information representing items purchased by the recipient customer using the gift card, balance information representing a current balance of the gift card, or the like.

Furthermore, in the examples above, the gift card may be a physical gift card or a digital gift card. For example, the buying customer may purchase a physical gift card from the merchant and the recipient customer may use the physical gift card to satisfy the cost of the transaction between the merchant and the recipient customer. For another example, the buying customer may purchase a physical gift card from the merchant and the recipient customer may load the physical gift card on the device of the recipient customer, such that the device of the recipient customer now displays a digital gift card that represents the physical gift card. The recipient customer may then then use the digital gift card presented on the device to satisfy the cost of the transaction with the merchant.

Finally, the techniques described above may be performed using more than one POS device of more than one merchant. For instance, the POS device of the merchant may send, to a service (such as payment service 108 in FIG. 1), the identifier of the gift card, the contact information for the buying customer, and the personalized message from the buying customer. The recipient customer may then use the gift card at a second POS device of a second merchant to satisfy a cost of a transaction between the second merchant and the recipient customer. The second POS device may then send, to the service, transaction information representing the transaction between the second merchant and the recipient customer. In response, the service may send the personalized message to the second POS device so that the second POS device can present the personalized message to the recipient customer.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 6:
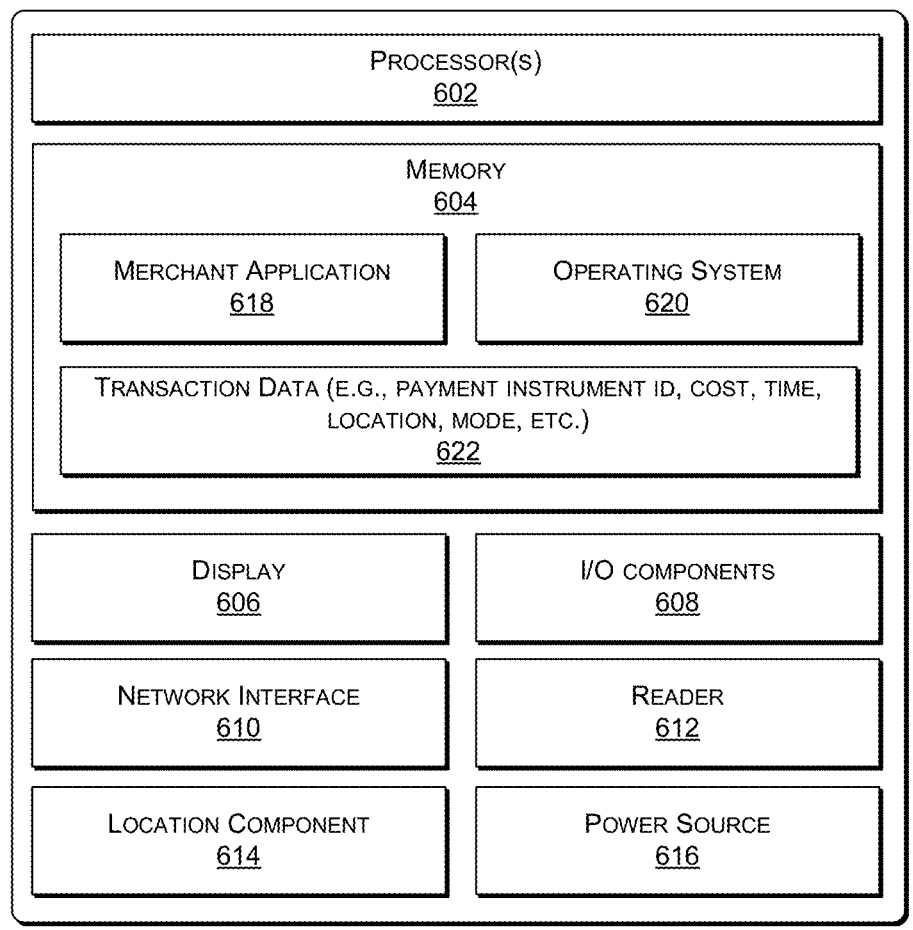
FIG. 6 illustrates select components of a POS device that a merchant described herein may utilize.

FIG. 1 illustrates an example environment 100 that includes a merchant 102 operating a point-of-sale (POS) device 104 to engage in various transactions with respective customers, such as customers 106(1) and 106(2). The POS device 104 may comprise any sort of mobile or non-mobile device that includes an instance of a merchant application that executes on the respective device (as illustrated in FIG. 6). The merchant application may provide POS functionality to the POS device 104 to enable the merchants 102 (e.g., an owner, employees, etc.) to accept payments from the customers 106(1) and 106(2). In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of items (goods and/or services) that is conducted between a customer and a merchant.

For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of the customers 106(1) and 106(2) may include one or more magnetic strips for providing card and customer information when swiped in a card reader. In other examples, other types of payment cards may be used, such as smart cards having a built-in memory chip that is read by the POS device 104 when the card is "dipped" into the reader, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104 can send the transaction information to a payment service 108 over a network 110, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106(1) and 106(2), the POS device 104 may provide the stored information to the payment service 108 over the network 110. The network 110 may represent any one or more wired or wireless networks, such as a WiFi network, a cellular network, or the like. In an online transaction, the POS device 104 may send this information to the payment service 108 over the network 110 substantially contemporaneously with the transaction with the customer.

As illustrated, the payment service 108 may include one or more processors 112 and memory 114, which may store a payment-processing module 116, a personalized message module 118, and historical data 120 storing gift card data, contact information for customers 106(1) and 106(2), and personalized messages from customers 106(1) and 106(2).

The payment processing module 116 may function to receive the information regarding a transaction from the POS device 104 and attempt to authorize the payment instrument used to conduct the transaction, as described above. The payment processing module 116 may then send an indication of whether the payment instrument has been approved or declined back to the POS device 104.

When a customer and a merchant enter into an electronic payment transaction, the transaction is processed by electronically transferring funds from a financial account associated with the customer to a financial account associated with the merchant. As such, the payment processing module 116 may communicate with one or more computing devices of a card network (or "card payment network"), e.g., MasterCard®, VISA®, over the network 110 to conduct financial transactions electronically. The payment processing module 116 can also communicate with one or more computing devices of one or more banks over the network 110. For example, the payment processing module 116 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In some instances, the POS device 104 and/or the payment service 108 may personalized gift cards for customers, such as customizing gift card 124 for customers 106(1) and 106(2). FIG. 1, for instance, illustrates an example where the customer 106(1) buys the gift card 124 from the merchant 102 at the physical establishment 122 of the merchant 102. At the time of and/or after buying the gift card 124 from the merchant 102, the POS device 104 may activate the gift card 124 for the customer 106(1) and receive a personalized message 130 from the customer 106(1). For example, the POS device 104 may receive a payment instrument from the customer 106(1) for associating a value with the gift card 124. The POS device 104 may then attempt to authorize the payment instrument for the value and store, in association with an identifier of the gift card 124, an indication of the value. Either the customer 106(1) or the customer 106(2) may then redeem to gift card 124 for the value at the merchant 102.

For instance, the POS device 104 may capture, using a camera (or a microphone or the like) of the POS device 104, the personalized message 130 from the customer 106(1) at the time of the customer 106(1) buying the gift card 124. For another instance, the POS device 104 may provide the customer 106(1) with a gift card receipt 124 at the time of and/or after the customer 106(1) buys the gift card 124 from the merchant 102, where the gift card receipt 126 includes a link 128 for the customer 106(1) to submit the personalized message 130. For example, the POS device 104 may receive (and store) contact information for the customer 106(1) at the time of the customer 106(1) buying the gift card 124 from the merchant 102. The POS device 104 may then send, using the contact information of the customer 106(1), a digital version of the gift card receipt 126 to a device of the customer 106(1). After receiving the gift card receipt 126, the customer 106(1) may use the link 128 on the gift card receipt 126 to send the POS device 104 the personalized message 130 via the device of the customer 106(1).

In the example of FIG. 1, the link 128 may comprise any type of address and/or reference to an online resource that the customer 106(1) may use to submit the personalized message 130 to the POS device 104 of the merchant 102 and/or to the payment service 108. For example, the link 128 may comprise a uniform resource locator (URL) to a website or webpage hosted by the merchant 102 and/or the payment service 108. The customer 106(1) may then use the URL to access, using a device of the customer 106(1), the website to submit the personalized message 130 to the POS device 104 of the merchant 102 and/or the payment service 108. For another example, the link 128 may comprise an email address for the merchant 102 and/or the payment service 108. The customer 106(1) may then use the email address to send, using the device of the customer 106(1), an email that includes the personalized message 130 to the POS device 104 of the merchant 102 and/or the payment service 108.

At the same time, while the POS device 104 receives the personalized message 130 from the customer 106(1), the POS device 104 and/or the payment service 108 are saving, in association with an identifier of the gift card 124, the personalized message from the customer 106(1). Furthermore, when the customer 106(1) provides contact information (e.g., the name, address, phone number, email address, or the like for the customer 106(1), the POS device 104 and/or the payment service 108 are further saving, in association with the identifier of the gift card 124, the contact information of the customer 106(1). For instance, the POS device 104 may send, to the payment service 108, the identifier of the gift card 124, the personalized message 130, and the contact information for the customer 106(1). The payment service 108 may then store, in association with the identifier of the gift card 124, the personalized message 130 and the contact information for the customer 106(1) in the historical data 120.

At a later time, the customer 106(2) may use the gift card 124 received from the customer 106(1) to purchase one or more items 132 from the merchant 102 at the physical establishment 122 of the merchant 102. For instance, the merchant 102 may use the POS device 104 to engage in a transaction with the customer 106(2) for one or more of the items 132. The customer 106(1) may use the gift card 124 at the POS device 104 to satisfy the cost of the transaction with the merchant 102.

During the transaction for the one or more of items 132, the POS device 104 may determine that the customer 106(2) is using the gift card 124 to satisfy the cost of the transaction. The POS device 104 may then present the personalized message 130 to the customer 106(2). For example, the POS device 104 may present the personalized message 130 to the customer 106(2) via a display (or speaker) of the POS device 104 at the time of the customer 106(2) satisfying the cost of the transaction with the merchant 102. For another example, the POS device 104 may use contact information for the customer 106(2) and send the personalized message to the device of the customer 106(2). Finally, for a third example, the POS device 104 may provide the customer 106(2) with a transaction receipt 134 for the transaction that includes a link 136 to view the personalized message 130 using the device of the customer 106(2).

For example, the POS device may provide the customer 106(2) with a physical transaction receipt 134 at the time of the transaction between the merchant 102 and the customer 106(2). The customer 106(2) may then use the link 136 on the physical transaction receipt 134 to view the personalized message 130 on a display of the device of the customer 106(2). For another example, the POS device 104 may receive contact information for the customer 106(2) at the time of the transaction and send, using the contact information of the customer 106(2), a digital version of the transaction receipt 134 to the device of the customer 106(2). The customer 106(2) may then use the link 136 provided with the digital version of the transaction receipt 134 to view the personalized message 130 on the display of the device of the customer 106(2).

It should be noted that the link 136 may be similar to the link 128 described above. For instance, the link 128 may comprise any type of address or reference to an online resource that the customer 106(2) may use to view the personalized message 130 and/or submit feedback 240 to the POS device 102 of the merchant 102 and/or the payment service 108 (which is described in greater detail below in FIG. 8). For example, the link 128 may comprise a uniform resource locator (URL) to a website or webpage hosted by the merchant 102 and/or the payment service 108. The customer 106(2) may then use the URL to access, using a device of the customer 106(2), the website to view the personalized message 130.

At the same time, while the customer 106(2) is using the gift card 124 to buy the one or more of items 132 from the merchant 102, the POS device 104 and/or the payment service 108 may be storing, in association with the identifier of the gift card 124, contact information (e.g., the name, address, phone number, email address, or the like) for the customer 106(2). For instance, the POS device 104 may send, to the payment service 108, the contact information for the customer 106(2) at the time of the transaction between the merchant 102 and the customer 106(2). The payment service 108 may then store, in association with the identifier of the gift card 124, the contact information of the customer 106(2) in historical data 120.

Besides personalizing the gift card 124 with the personalized message 130 for the customer 106(2), the customer 106(1) may personalize the gift card 124 by purchasing one or more additional items 132 for the customer 106(2). For instance, the customer 106(1) may buy one of the items 132 of the merchant 102 at the time of buying the gift card 124 from the merchant 102. The POS device 104 and/or the payment service 108 may then store, in association with the identifier of the gift card 124, an item identifier for the one or more items 132. The POS device 108 may then notify the merchant 102 and/or the customer 106(2) of the one or more items 132 at the time of the customer 106(2) using the gift card 124 to satisfy the cost of the transaction with the merchant.

In FIG. 1, the payment service 108 may be using the personalized message module 108 to personalize the gift card 124. For instance, the POS device 104 and/or a device of the customer 106(2) may send, to the payment service 108, transaction information associated with the gift card 124 (e.g., transaction information representing the transaction between the merchant 102 and the customer 106(2)). The payment service 108 may then use the personalized message module 118 to send the personalized message 130 to the POS device 104 and/or the device of the customer 106(2) in response to receiving the transaction information.

Figure 2:
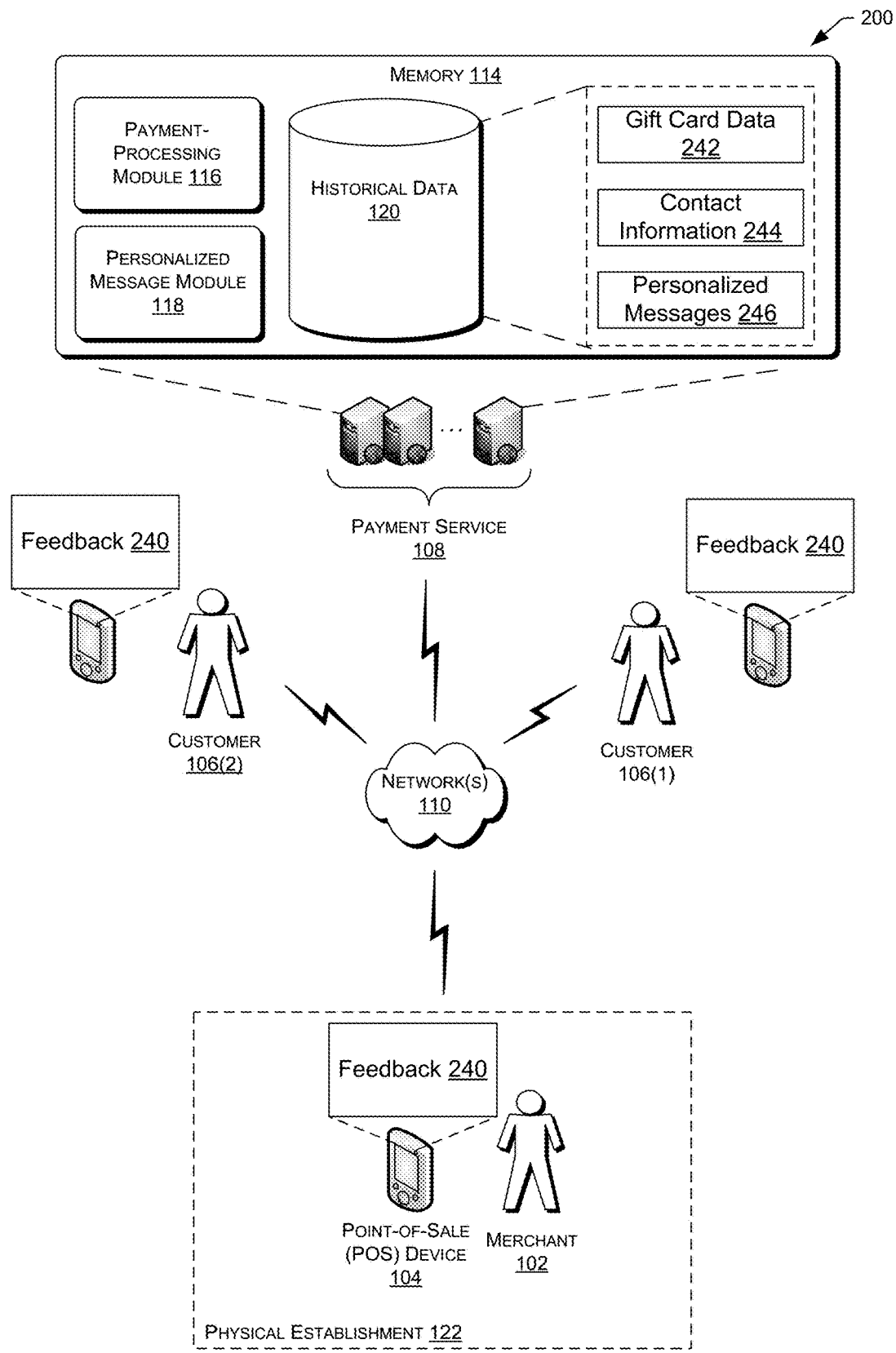
FIG. 2 illustrates an example of a recipient customer of a gift card providing feedback to a POS device and/or payment service after the recipient customer uses the gift card at a merchant to satisfy a cost of a transaction with the merchant. In this example, the POS device and/or payment service further sends the feedback to a buying customer of the gift card.

FIG. 2 illustrates an example that includes the POS device 104 receiving feedback 240 from the customer 106(2) during and/or after the transaction between the merchant 102 and the customer 106(2) from FIG. 1. For instance, the POS device 104 may send, using the contact information for the customer 106(2), a digital version of the transaction receipt 134 to the device of the customer 106(2). The customer 106(2) may then further use the link 136 from the digital transaction receipt 134 to send the feedback 240 back to the POS device 104 of the merchant 102 via the device of the customer 106(2). Furthermore, the POS device 104 of the merchant 102 may send, using the contact information for the customer 106(1), the feedback 240 from the customer 106(2) to the device of the customer 106(1). Finally, the customer 106(1) may view the feedback 240 on a display of the device of the customer 106(1).

FIG. 2 also illustrates that historical data 120 of payment service 108 includes gift card data 242, contact information 244, and personalized messages 246. For instance and as discussed above, the POS device 104 may send, to the payment service 108, the identifier of the gift card 124, the personalized message 130, the contact information for the customer 106(1), the contact information for the customer 106(2), and optionally identifiers of any additional items 132 the customer 106(1) buys to personalized the gift card 124. Furthermore, the POS device 104 and/or the device of the customer 106(2) may send the feedback 240 from the customer 106(2) to the payment service 108. In response, the payment service 108 may store, in the historical data 120, the identifier of the gift card 124 and the identifiers of any additional items 132 as gift card data 242, the contact information of the customers 106(1) and 106(2) as contact information 224, and the personalized message 130 and the feedback 240 as personalized messages 246.

Figure 3:
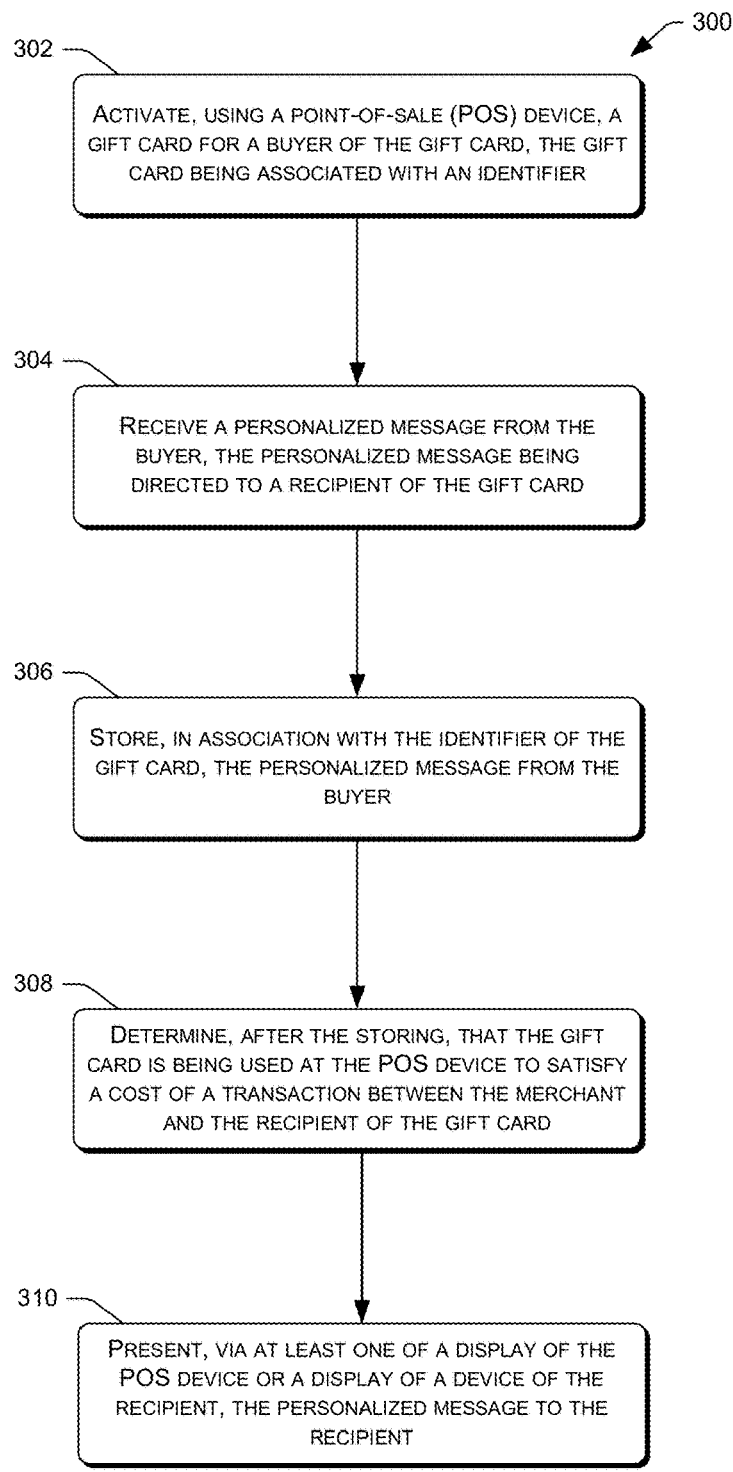
FIG. 3 illustrates a flow diagram of a process for personalizing gift cards.

FIG. 3 illustrates a flow diagram of a process 300 for personalizing a gift card. The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300, and other processes described herein, may be performed by a POS device, by a remote payment service (e.g., payment service 108), by another entity, or by a combination thereof.

At 302, the process 300 activates, using a point-of-sale (POS) device, a gift card for a buyer of the gift card, the gift card being associated with an identifier. Additionally, the POS device may send, to a payment service, the identifier of the gift card.

At 304, the process 300 receives a personalized message from the buyer, the personalized message being directed to a recipient of the gift card. For example, the POS device may receive the personalized message from the recipient via a camera of the POS device or a device of the recipient. In another example, a payment service may receive the personalized message from the POS device and/or the device of the recipient.

At 306, the process 300 stores, in association with the identifier of the gift card, the personalized message from the buyer. At 308, the process 300 determines, after the storing, that the gift card is being used at the POS device to satisfy a cost of a transaction between the merchant and the recipient of the gift card. For example, the POS device and/or the device of the recipient may send, to the payment service, transaction information that represents the transaction between the merchant and the recipient.

At 310, the process 300 presents, via at least one of a display of the POS device or a display of a device of the recipient, the personalized message to the recipient. For example, the payment service may send, to the POS device and/or the device of the recipient, the personalized message or a link to the personalized message in response to receiving the transaction information.

Figure 4:
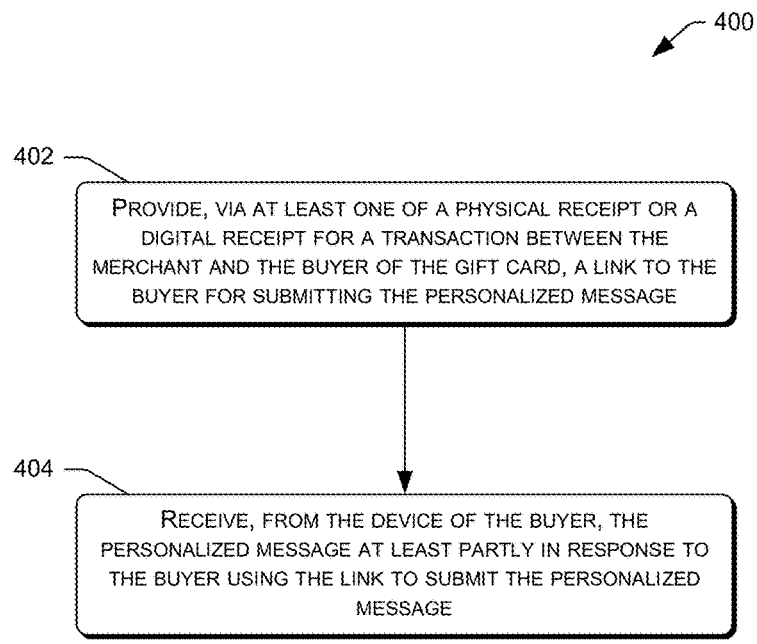
FIG. 4 illustrates a flow diagram of a process for receiving a personalized message from the customer that buys the gift card.

FIG. 4 illustrate a flow diagram of a process 400 for receiving a personalized message from the customer that buys of a gift card.

At 402, the process 400 provides, via at least one of a physical receipt or a digital receipt for a transaction between the merchant and the buyer for the gift card, a link to the buyer for submitting the personalized message. For example, the POS device and/or the payment service send, using contact information for the buyer, the digital receipt to the device of the buyer. At 404, the process 400 receives, from the device of the buyer, the personalized message at least partly in response to the buyer using the link to submit the personalized message.

Figure 5A:
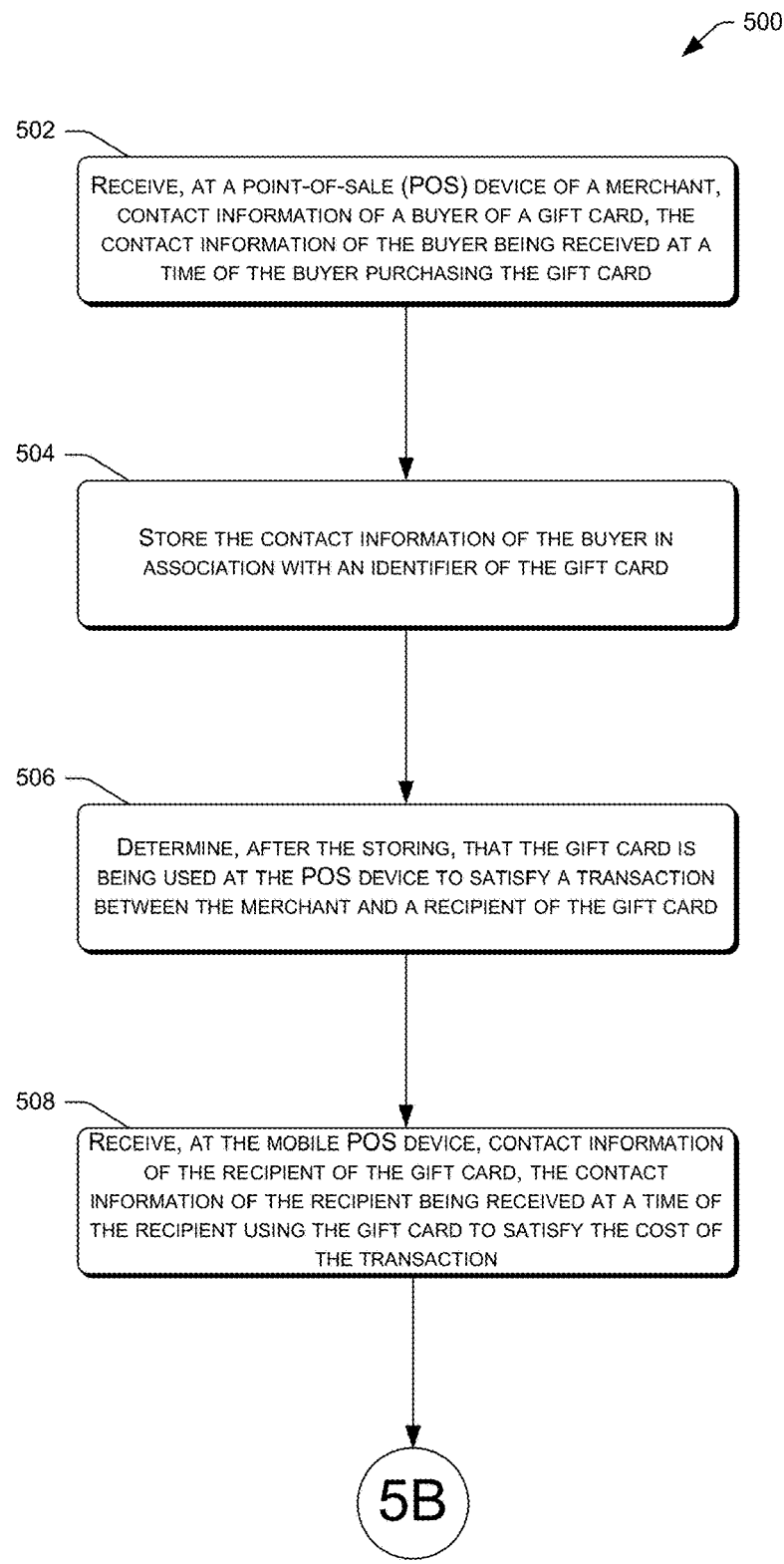
FIGS. 5A-5B illustrates a flow diagram of a process for sending feedback from a recipient of a gift card to a buyer of a gift card after the recipient uses the gift card to satisfy a cost of a transaction with a merchant.
Figure 5B:
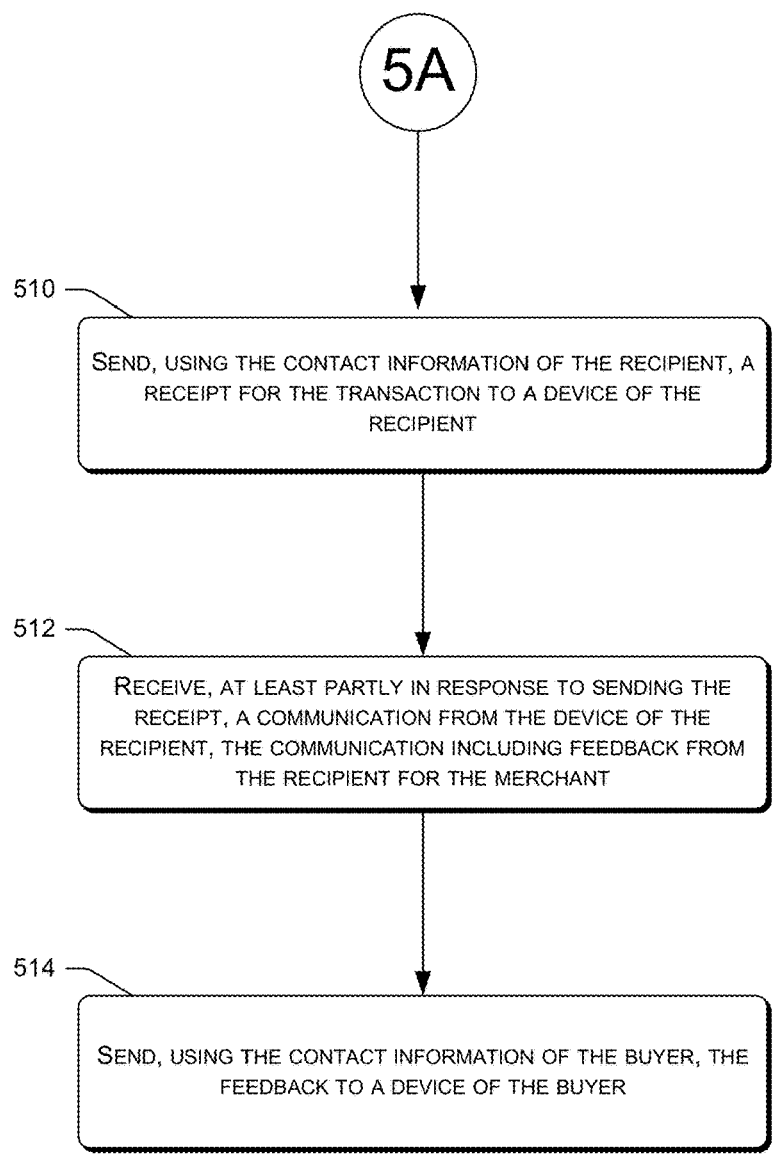

FIGS. 5A-5B illustrates a flow diagram of a process for sending feedback from a recipient of a gift card to a buyer of a gift card after the recipient uses the gift card to satisfy a cost of a transaction with a merchant.

At 502, the process 500 receives, at a point-of-sale (POS) device of a merchant, contact information of a buyer of a gift card, the contact information of the buyer being received at a time of the buyer purchasing the gift card. At 504, the process 500 stores the contact information of the buyer in association with an identifier of the gift card. Additionally, the POS device may send, to a payment service, the identifier of the gift card and the contact information of the buyer to store.

At 506, the process 500 determines, after the storing, that the gift card is being used at the POS device to satisfy a cost of a transaction between the merchant and a recipient of the gift card. For example, the POS device may send, to the payment service, transaction information representing the transaction between the merchant and the recipient. Additionally, the POS device and/or the payment service may send, using the contact information of the buyer, a message to the buyer regarding the transaction between the merchant and the recipient. For example, the message may include information notifying the buyer that the recipient is using the gift card and/or the items that the recipient is purchasing with the gift card. The message may further notify the buyer of how much money is left on the gift card after the transaction.

At 508, the process 500 receives, at the POS device, contact information of the recipient of the gift card, the contact information of the recipient being received at a time of the recipient using the gift card to satisfy the cost of the transaction. Additionally, the POS device may send, to the payment service, the contact information of the recipient. The payment service may then store, in association with the identifier of the gift card, the contact information of the recipient.

At 510, the process 500 sends, using the contact information of the recipient, a receipt for the transaction to a device of the recipient. At 512, the process 500 receives, at least partly in response to the sending the receipt, a communication from the device of the recipient, the communication including feedback from the recipient for the merchant.

At 514, the process 500 sends, using the contact information of the buyer, the feedback to a device of the buyer. Additionally, a display of the device of the buyer may present the feedback to the buyer.

For example, the POS device of the merchant and/or the payment service may receive feedback from the buyer that includes a video of the recipient providing a personalized message to the buyer, a review of the merchant from the recipient, sales information representing items purchased by the recipient using the gift card, balance information representing a current balance of the gift card, or the like. The POS device and/or the payment service may then send, using the contact information of the buyer, the feedback to the device of the buyer. For example, the POS device and/or payment service may use the phone number of the buyer, an email of the buyer, or other contact information to send the buyer the feedback.

FIG. 6 illustrates select example components of an example POS device 600 according to some implementations. The POS device 600 may be any suitable type of computing device, e.g., mobile, semi-mobile, semi-stationary, or stationary. Some examples of the POS device 600 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 600 includes at least one processor 602, memory 604, a display 606, one or more input/output (I/O) components 608, one or more network interfaces 610, at least one card reader 612, at least one location component 614, and at least one power source 616. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the memory 604.

Depending on the configuration of the POS device 600, the memory 604 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the POS device 600 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602. Further, when mentioned, non-transitory computer-readable media exclude media such as energy, carrier signals, electromagnetic waves, and signals per se.

The memory 604 may be used to store and maintain any number of functional components that are executable by the processor 602. In some implementations, these functional components comprise instructions or programs that are executable by the processor 602 and that, when executed, implement operational logic for performing the actions and services attributed above to the POS device 600. Functional components of the POS device 600 stored in the memory 604 may include a merchant application 618, which may interact with applications executing on client devices to allow customers to pay for items offered by the merchant. The merchant application 618 may present an interface on the POS device 600 to enable the merchant to conduct transactions, receive payments, and so forth, as well as communicating with the payment service 108 for processing payments and sending transaction information. Further, the merchant application 618 may present an interface to enable the merchant to manage the merchant's account, and the like. Finally, the merchant application 618 may personalize gift cards by receiving a personalized message from a customer buying a gift card, storing the personalized video in association with an identifier of the gift card, determining that the physical gift card is being used at the POS device 600 to satisfy a cost of a transaction between the merchant and a recipient customer of the gift card, and presenting the personalized message to the recipient customer. Additionally, the merchant application 618 may receive feedback from a device of the recipient customer of the gift card, and the merchant application may send the feedback to a device of the buying customer of the gift card.

Additional functional components may include an operating system 620 for controlling and managing various functions of the POS device 600 and for enabling basic user interactions with the POS device 600. The memory 604 may also store transaction data 622 that is received based on the merchant associated with the POS device 600 engaging in various transactions with customers, such as the example customers 106(1) and 106(2) from FIG. 1.

In addition, the memory 604 may also store data, data structures and the like, that are used by the functional components. For example, this data may include item information that includes information about the items offered by the merchant, which may include images of the items, descriptions of the items, prices of the items, and so forth. Depending on the type of the POS device 600, the memory 604 may also optionally include other functional components and data, which may include programs, drivers, etc., and the data used or generated by the functional components. Further, the POS device 600 may include many other logical, programmatic and physical components, of which those described are merely examples that are related to the discussion herein.

The network interface(s) 610 may include one or more interfaces and hardware components for enabling communication with various other devices over the network or directly. For example, network interface(s) 610 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 6 further illustrates that the POS device 600 may include the display 606 mentioned above. Depending on the type of computing device used as the POS device 600, the display 606 may employ any suitable display technology. For example, the display 606 may be a liquid crystal display, a plasma display, a light emitting diode display, an OLED (organic light-emitting diode) display, an electronic paper display, or any other suitable type of display able to present digital content thereon. In some examples, the display 606 may have a touch sensor associated with the display 606 to provide a touchscreen display configured to receive touch inputs for enabling interaction with a graphic interface presented on the display 606. Accordingly, implementations herein are not limited to any particular display technology. Alternatively, in some examples, the POS device 600 may not include the display 606, and information may be present by other means, such as aurally.

The I/O components 608, meanwhile, may include speakers, a microphone, a camera, and various user controls (e.g., buttons, a joystick, a keyboard, a keypad, etc.), a haptic output device, and so forth.

In addition, the POS device 600 may include or may be connectable to a payment instrument reader 612. In some examples, the reader 612 may plug in to a port in the merchant device, such as a microphone/headphone port, a data port, or other suitable port. In other instances, the reader 612 is integral with the entire POS device 600. The reader 612 may include a read head for reading a magnetic strip of a payment card, and further may include encryption technology for encrypting the information read from the magnetic strip. Alternatively, numerous other types of card readers may be employed with the POS devices 600 herein, depending on the type and configuration of a particular POS device 600.

The location component 614 may include a GPS device able to indicate location information, or the location component 614 may comprise another other location-based sensor. The POS device 600 may also include one or more additional sensors (not shown), such as an accelerometer, gyroscope, compass, proximity sensor, and the like. Additionally, the POS device 600 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
receiving, at a point-of-sale (POS) device of a merchant, payment information associated with a payment instrument of a buyer for associating a value with a physical gift card;
attempting to authorize the payment instrument for the value;
storing, in association with an identifier of the physical gift card, an indication of the value;
receiving, at the POS device, contact information of the buyer of the physical gift card;
storing the contact information of the buyer in association with the identifier of the physical gift card;
determining, after storing the contact information and based, at least in part, on receiving an indication from a payment instrument reader of the POS device, that the physical gift card is being used at the POS device to satisfy a cost of a transaction between the merchant and a recipient of the physical gift card;
receiving, at the POS device, contact information of the recipient of the physical gift card, the contact information of the recipient being received at a time of the recipient using the physical gift card to satisfy the cost of the transaction;
sending, by the POS device, and using the contact information of the recipient, a receipt for the transaction to a device of the recipient, the receipt for the transaction including at least a mechanism for sending at least a communication to the POS device;
receiving, at the POS device and directly from the device of the recipient, and at least partly in response to sending the receipt that includes the mechanism, the communication from the device of the recipient, the communication including feedback from the recipient;
determining that the buyer is conducting a second transaction at the POS device; and
presenting, at the POS device, the feedback based at least in part on determining that the buyer is conducting the second transaction at the POS device.

2. A method of claim 1, wherein the feedback comprises at least one of a personalized message to the buyer, a review of the merchant from the recipient, sales information representing an item purchased by the recipient using the physical gift card, or balance information representing a current balance of the physical gift card.

3. A method of claim 1, further comprising:
receiving a personalized message from the buyer for the recipient of the gift card;
storing, in association with the identifier of the gift card, the personalized message from the buyer; and
sending, using the contact information of the recipient, the personalized message to the device of the recipient.

4. The method as recited in claim 1, further comprising:
receiving, by the POS device, and using a camera, a message from the recipient at the time of the recipient using the physical gift card to satisfy the cost of the transaction; and
presenting, at the POS device, the message based at least in part on determining that the buyer is located at the physical establishment.

5. The method as recited in claim 1, further comprising:
storing, in association with the identifier, an identifier of an item purchased by the buyer; and
based at least in part on determining that the physical gift card is being used at the POS device to satisfy the cost of the transaction, presenting a notification associated with the item.

6. The method as recited in claim 1, further comprising causing a physical receipt for the transaction to the printed, the physical receipt including at least the mechanism for sending the communication to the POS device.

7. A point-of-sale (POS) device comprising:
a display;
a payment instrument reader;
one or more processors; and
one or more computer-readable media storing instructions executable by the one or more processors, wherein the instructions program the one or more processors to:
receive contact information for a buyer of a gift card;
store, in the one or more computer-readable media, the contact information;
determine, based, at least in part, on receiving an indication from the payment instrument reader of the POS device, that the gift card is being used at the POS device to satisfy a cost of a transaction between a merchant of the POS device and a recipient of the gift card;

send, to a device of the recipient, a receipt for the transaction, the receipt including at least a mechanism for providing a communication to the POS device;

receive, directly from the device of the recipient and based at least in part on sending the receipt that includes the mechanism, the communication from the device of the recipient;

determine that the buyer is conducting a second transaction at the POS device; and present, using the display, the communication based at least in part on determining that the buyer conducting a second transaction at the POS device.

8. A POS device of claim 7, wherein the communication comprises at least one of a personalized message to the buyer, a review of the merchant from the recipient, sales information representing an item purchased by the recipient using the gift card, or balance information representing a current balance of the gift card.

9. A POS device of claim 7, further comprising:
a camera,
and wherein the instructions further program the one or more processors to:
capture, using the camera of the POS device, an additional communication from the recipient at a time of the recipient using the gift card to satisfy the cost of the transaction.

10. A POS device of claim 7, wherein the contact information is received at a time of the buyer purchasing the gift card, and wherein the instructions further program the one or more processors to:
receive contact information of the recipient at a time of the recipient using the gift card to satisfy the cost of the transaction,
and wherein the contact information of the recipient is used to send the receipt for the transaction to the device of the recipient.

11. A POS device of claim 10, wherein the instructions further program the one or more processors to:
send, at least partly in response to receiving the contact information of the buyer, the contact information of the buyer to a payment service; and
send, at least partly in response to receiving the contact information of the recipient, the contact information of the recipient to the payment service,
and wherein the payment service stores, in association with an identifier of the gift card, the contact information of the buyer and the contact information of the recipient.

12. A POS device of claim 7, further comprising:
a camera,
and wherein the instructions further program the one or more processors to:
capture, at a time of the buyer purchasing the gift card, a personalized message from the buyer for the recipient of the gift card using the camera of the POS device; and
present, at a time of the recipient using the gift card to satisfy the cost of the transaction, the personalized message to the recipient using the display of the POS device.

13. A POS device of claim 7, wherein the instructions further program the one or more processors to:
receive, at a time that the buyer is purchasing the gift card, a personalized message from the buyer for the recipient of the gift card, and wherein the receipt for the transaction further includes a link to the personalized message.

14. A system comprising:
one or more processors; and
one or more computer-readable media storing computer-executable instructions that, when executed on one or more processors, cause the one or more processors to perform the acts comprising:
receiving, from a point-of-sale (POS) device of a merchant, contact information of a buyer of a gift card;
storing, in association with an identifier of the gift card, the contact information of the buyer;
receiving, from the POS device or an additional POS device, transaction information indicating that the gift card is being used by a recipient to satisfy a cost of a transaction between the recipient and the merchant or an additional merchant, the transaction information being based, at least in part, on an indication from a payment instrument reader of the POS device;
sending, to a device of the recipient, a receipt for the transaction, the receipt including at least a mechanism for providing a communication;
receiving, at the POS device and based at least in part on sending the receipt that includes the mechanism, the communication from the device of the recipient;
determining that the buyer is conducting a second transaction at the POS device; and
sending, using the contact information of the buyer, the communication to a device of the buyer based at least in part on determining that the buyer is conducting a second transaction at the POS device.

15. A system as recited in claim 14, wherein the communication comprises a personalized message to the buyer.

16. A system as recited in claim 14, wherein the communication comprises a review of the merchant from the recipient.

17. A system as recited in claim 14, wherein the communication comprises sales information representing an item purchased by the recipient using the gift card.

18. A system as recited in claim 14, wherein the communication comprises balance information representing a current balance of the gift card.

19. A system as recited in claim 14, the acts further comprising:
receiving, from the POS device, contact information of the recipient of the gift card, the contact information of the recipient being received at a time of the recipient using the gift card to satisfy the cost of the transaction,
and wherein sending the receipt for the transaction is further based at least in part on receiving the contact information of the recipient.

20. A system as recited in claim 14, the acts further comprising:
receiving, from the POS device, a personalized message from the buyer for the recipient of the gift card;
storing, in association with the identifier of the gift card, the personalized message from the buyer;

receiving, from the POS device, contact information of the recipient of the gift card, the contact information of the recipient being received at a time of the recipient using the gift card to satisfy the cost of the transaction; and sending, using the contact information of the recipient, the personalized message to the device of the recipient.

\* \* \* \* \*